July 10, 1962  S. E. COLEY  3,043,634
BEARINGS
Filed Aug. 11, 1960
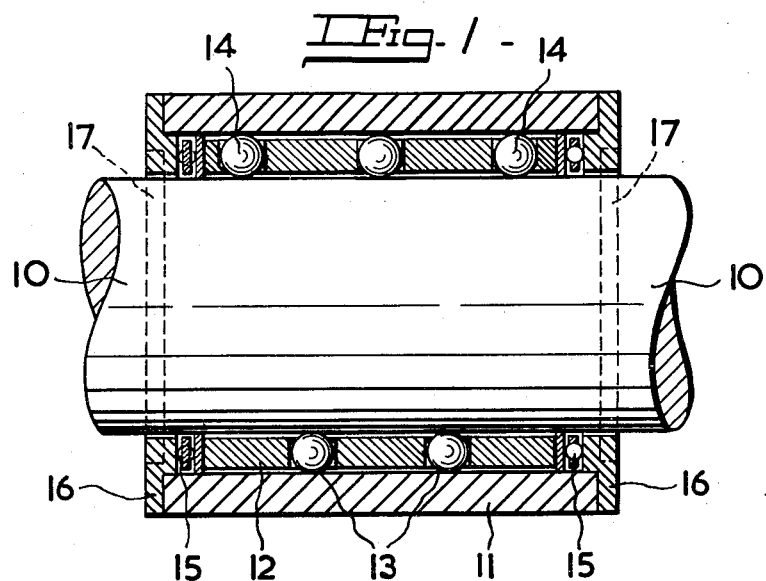
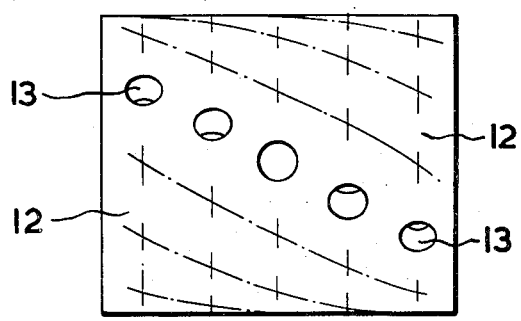
Inventor
Samuel E. Coley
By Kenny, Palmer & Stewart
Attorneys 3,043,634
BEARINGS
Samuel Ernest Coley, "Wayside" Penn Lane,
Tanworth-in-Arden, England
Filed Aug. 11, 1960, Ser. No. 48,950
3 Claims. (Cl. 308—6)

This invention relates to improvements in bearings and more particularly to bearings for rectilinear motion, although my invention can also be applied to rotary bearings.

In order to reduce frictional resistance to relative axial movement between a shaft and a housing through which the shaft extends, it is known to provide between the shaft and the housing a cage in which are mounted balls in rolling contact with the shaft and with the internal surface of the housing.

According to the present invention there is provided a bearing comprising a shaft, a plurality of shaft-engaging balls, a ball cage surrounding the shaft and having a plurality of openings arranged in helical lines, one of said balls being rotatably disposed in each of said openings, a housing having an inner surface concentric with said shaft and engaged by said balls, and a pair of spaced thrust bearings between the cage and the housing to restrain relative axial movement between the cage and the housing whilst allowing relative rotational movement between the cage and the housing.

It has been found that on relative axial movement between the shaft and the housing the cage rotates about its axis, and experimental tests have shown that a bearing of this form reduces to a minimum frictional resistance to relative movement between the shaft and the housing and it also reduces wear to a minimum.

The rotation of the cage ensures that the balls have no definite tracks on the engaging surfaces so that any wear is distributed over the whole area of the engaging surfaces and it becomes possible to use a relatively soft shaft. This is an important advantage in assemblies requiring a long movement as it avoids the practical difficulties of hardening and grinding a long shaft. If the shaft is of unhardened steel, the balls may be of Phosphor bronze or like material.

Another advantage is that where the axis of the shaft is horizontal and a load is carried by the housing which is movable along the shaft, the ball cage is always in alignment with the load and the rotation of the cage distributes the load over all the balls in turn.

One form of bearing in accordance with my invention is illustrated by way of example in the accompanying drawings in which:

FIGURE 1 is a longitudinal section of the bearing,

FIGURE 2 is a diagrammatic plan of the cage showing the distribution of the balls.

In the bearing illustrated, 10 is a cylindrical shaft and 11 is a cylindrical housing which takes the form of a bush, with its inner surface concentric with the shaft but of an internal diameter substantially greater than the diameter of the shaft. Between the shaft and the housing there is a sleeve-like cage 12 having spaced openings 13 in which are rotatably mounted balls 14 of such diameter that they are in rolling contact with the shaft and with the internal surface of the housing. As shown best in FIGURE 2, the openings 13 are arranged in a series of helical lines in the sleeve or cage.

The sleeve or cage is of less axial length than the housing, and it is restrained from movement in an axial direction relative to the housing by ball-thrust bearings 15, located between the ends of the cage and inwardly directed annular members 16 secured in any convenient manner in the ends of the housing. The cage is thus free to rotate within the housing and about the shaft, and the cage together with the housing is free to move axially relative to the shaft, but no relative axial movement is permitted between the cage and the housing.

Seals indicated in dotted lines at 17 will normally be incorporated in the annular end members 16 to retain oil and prevent the entry of dust into the bearing.

It will be appreciated that the bearing is equally effective whether the relative movement between the shaft and the housing is purely rectilinear or whether there is relative rotation between them.

The reason why the cage rotates on relative axial movement between the shaft and the housing is not fully understood, but it is believed that the helical arrangement of the balls, being asymmetrical, gives rise to the couple tending to rotate the cage. This effect may also be increased by asymmetrical external loading.

The bearing is preferably pre-loaded by making the radial spacing between the shaft and the inner surface of the housing slightly less than the diameter of the balls so that the balls are slightly compressed when the bearing is assembled. The pre-loading of the bearing eliminates any small manufacturing tolerances in the component parts of the bearing which do not require a working tolerance and it also eliminates any tendency for the bearing to chatter or deflect under load.

I claim:

1. A shaft bearing assembly comprising in combination: a shaft; a housing having an inner surface concentric with said shaft; and bearing means supporting said shaft for axial movement relative to said housing, said bearing means comprising a plurality of shaft-engaging balls, a ball cage surrounding the shaft and having a plurality of openings arranged in helical lines, one of said balls being rotatably disposed in each of said openings and engaging the inner surface of said housing, and a pair of spaced thrust bearings between the cage and said housing to restrain relative axial movement between the cage and said housing while allowing relative rotational movement between the cage and said housing.

2. The assembly recited in claim 1 in which the cage is of less axial length than the housing, inwardly directed annular members are secured to the ends of the housing and the thrust bearings are in the form of ball thrust bearings disposed between the ends of the cage and the said annular members.

3. The assembly recited in claim 1 in which the radial spacing between the shaft and the inner surface of the housing is slightly less than the diameter of the balls so that the balls are slightly compressed when the bearing is assembled.

References Cited in the file of this patent

UNITED STATES PATENTS

| | | |
|---|---|---|
| 466,439 | Simonds | Jan. 5, 1892 |
| 817,737 | Goble | Apr. 10, 1906 |
| 1,064,863 | Sharpneck | June 17, 1913 |
| 1,976,637 | Scott | Oct. 9, 1934 |
| 2,422,774 | Conner | June 24, 1947 |
| 2,897,582 | Blazek et al. | Aug. 4, 1959 |